United States Patent
Guo et al.

(10) Patent No.: US 8,681,677 B2
(45) Date of Patent: Mar. 25, 2014

(54) PROCESSING METHOD AND APPARATUS FOR IU INTERFACE PARALLEL MULTIMEDIA BROADCAST MULTICAST SERVICE SESSION START-UP

(75) Inventors: Longping Guo, Shenzhen (CN); Hengxing Zhai, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 760 days.

(21) Appl. No.: 12/598,023

(22) PCT Filed: Aug. 13, 2007

(86) PCT No.: PCT/CN2007/002429
§ 371 (c)(1), (2), (4) Date: Mar. 11, 2010

(87) PCT Pub. No.: WO2008/131611
PCT Pub. Date: Nov. 6, 2008

(65) Prior Publication Data
US 2010/0172280 A1 Jul. 8, 2010

(30) Foreign Application Priority Data
Apr. 30, 2007 (CN) .......................... 2007 1 0104321

(51) Int. Cl.
*H04J 3/26* (2006.01)
(52) U.S. Cl.
USPC .......................................... 370/312; 370/432
(58) Field of Classification Search
USPC ........................................................ 370/312
See application file for complete search history.

(56) References Cited

U.S. PATENT DOCUMENTS

| | | | |
|---|---|---|---|
| 2003/0231612 A1* | 12/2003 | Kim et al. ..................... | 370/342 |
| 2005/0041608 A1* | 2/2005 | Jeong et al. ................... | 370/310 |
| 2005/0090278 A1* | 4/2005 | Jeong et al. ................... | 455/525 |
| 2006/0029066 A1* | 2/2006 | Jeong et al. ................... | 370/389 |
| 2006/0058047 A1* | 3/2006 | Jeong et al. ................... | 455/464 |
| 2007/0213081 A1* | 9/2007 | Zhang ........................... | 455/466 |
| 2007/0218835 A1* | 9/2007 | Hindelang et al. ............... | 455/8 |
| 2007/0275742 A1* | 11/2007 | Zhang ........................... | 455/466 |
| 2011/0065393 A1* | 3/2011 | Pekonen et al. ........... | 455/67.11 |

FOREIGN PATENT DOCUMENTS

CN 1645798 7/2005
CN 1758644 4/2006

* cited by examiner

*Primary Examiner* — Gerald Smarth
(74) *Attorney, Agent, or Firm* — Li & Cai Intellectual Property (USA) Office

(57) ABSTRACT

The present invention provides a method and an apparatus for processing Iu interface parallel multimedia broadcast multicast service session start-up, wherein the method comprises: after receiving a MBMS session start message sent by SGSN, RNC detects whether other sessions of a same MBMS service have been established; and when the other sessions of the same MBMS service are determined to have been established in the RNC, the RNC detects whether the MBMS service area carried in the MBMS session start message and that of the other MBMS sessions established between the RNC and the SGSN intersect or overlap or whether the MBMS service area carried in the MBMS session start message and that of the MBMS session established between the RNC and other SGSNs intersect, and processing on multimedia broadcast multicast service session start-up is performed according to the detecting result.

12 Claims, 4 Drawing Sheets

PROCESSING METHOD AND APPARATUS FOR LU INTERFACE PARALLEL MULTIMEDIA BROADCAST MULTICAST SERVICE SESSION START-UP

TECHNICAL FIELD

The present invention relates to mobile communication field, more specifically, relates to a processing method and an apparatus for Iu interface parallel MBMS (Multimedia Broadcast Multicast Service) service session in the CDMA (Code Division Multiple Access) system.

BACKGROUND OF THE INVENTION

To make use of mobile network resource effectively, 3GPP (Third Generation Partnership Project) has proposed MBMS, that is, a point-to-multipoint service in which a data source sends data to a plurality of users is provide, to realize shared network resource and increase the utilization of network resource, especially that of precious air interface resources. MBMS not only enables to achieve multicast and broadcast of message type of pure text with low rate, but also to achieve multicast and broadcast of high speed multimedia services, providing a wide variety of services of video, audio and multimedia, which undoubtedly conforms to the trend of the future development of mobile data and provides a better service prospect for the development of mobile communication.

FIG. 1 shows the structure model diagram of MBMS service system. As shown in FIG. 1, Broadcast-Multicast Service Center (BM-SC) is a new mobile network functional entity for authorizing and initiating of MBMS carried services in the mobile network and transmitting MBMS contents according to the predetermined schedule as an entrance of contents provider.

For the existing WCDMA packet network functional entities, MBMS related functions and processes also need to be added in GGSN (General Packet Radio Service Gateway Support Node), SGSN (Serving General Packet Radio Service Support Node), RAN (Radio Access Net) and UE (User Equipment).

MBMS includes Broadcast Service and Multicast Service. There are certain scope restrictions of sending MBMS services, i.e. each MBMS service is sent within a certain area, which is called service area corresponding to a MBMS service. According to 3GPP protocol, the sending area of broadcast services is defined to be Broadcast Service area of the service and that of multicast service is defined to be Multicast service area of the service. Considering regional characteristics of some MBMS services, such as weather forecast, traffic and road condition, the content sent by it is associated with the region where UE is located. The UE, when it is located in a certain region of a MBMS service area, only needs to receive the contents associated with that region, which leads to the need of sending different service contents for the same MBMS service in different regions. Therefore, 3GPP also defines Local Broadcast Area and Local Multicast Area respectively for broadcast services and multicast services.

FIG. 2 is a diagram schematically showing the relations between MBMS service area and local service area in the prior arts. As shown in FIG. 2, for each MBMS broadcast service there is a broadcast service area, which comprises one or more local broadcast areas. In one local broadcast area, only service contents associated with this region are sent and service contents sent in different local broadcast areas may be different. For each MBMS multicast service, there is a multicast service area, which comprises one or more local multicast areas. In one local multicast area, only service contents associated with this region are sent and service contents sent in different local multicast areas may be different.

MBMS service data is sent via MBMS carrying. MBMS carrying is managed through MBMS session, one MBMS session corresponds to one MBMS carrying and each MBMS session corresponds to a MBMS Service Area (MBMS SA), which composed of one or more MBMS Service Area Identities (MBMS SA ID). Each MBMS SA ID corresponds to one or more cells in RNC (Radio Network Controller). At the beginning of a MBMS session, MBMS SA is brought to RNC by MB-SC through GGSN and SGSN, and after receiving MBMS session start request, RNC only provides MBMS services in the cells included in the service area of the MBMS services.

If one MBMS service is divided into a plurality of local areas, it is required that MBMS carryings carrying service data are different as service contents sent in different areas are not the same, and therefore, each MBMS session will be set up for each local area by BM-SC, i.e. a plurality of parallel MBMS sessions are initiated and the parallel MBMS sessions use the same TMGI (Temporary Mobile Group Identity) to indicate that they belong to the same MBMS service. As MBMS service contents sent in the same local area are required to be the same, MBMS SAs corresponding to parallel MBMS sessions in different local areas of the same MBMS service are different, in other words, cells included in the MBMS SA corresponding to MBMS sessions in different local areas of the same MBMS service cannot intersect, otherwise in the intersecting cells UE may receive service contents of a plurality of local areas.

FIG. 3 is a work flowchart showing the start-up process of an Iu interface MBMS session of 3GPP in the prior arts. As shown in FIG. 3, the process comprises the following steps:

Step 302, SGSN sends a "MBMS session start" message, which comprises the MBMS service area, to RNC to request it to inform UE MBMS of the session start-up in the service area corresponding to the MBMS service;

Step 304, RNC receives the "MBMS session start" message and detects whether there are other established sessions of the same MBMS service between this RNC and this SGSN;

Step 306, if there are other established sessions and the MBMS service area corresponding to the other established sessions and that carried by the new message sent by the SGSN intersect, the MBMS service area in the message is considered to be invalid and a "MBMS session start failure" message is returned to SGSN; and Step 308, if there are no other established sessions of the same MBMS service or the MBMS service area corresponding to the other established sessions and that carried by the new message sent by the SGSN do not intersect, the processing is performed as a normal message and a "MBMS session start response" message or "MBMS session start failure" message is returned to SGSN according to the processing result.

The following process is performed to detect whether the MBMS service area of the MBMS session to be established and that of the other established sessions of the same service intersect or not according to the existing protocols: it is determined whether the MBMS service area carried by the MBMS session start message and that of the other established sessions have at least one or more identical MBMS service area identifications.

As one MBMS service area identification corresponds to one or more cells in RNC, one cell in RNC can be also mapped onto a plurality of MBMS service area identifications. According to the MBMS overlapping detecting method in the existing protocols, even MBMS service areas of two parallel MBMS sessions have completely different MBMS service area identifications, and the cells corresponding to respective MBMS service area identification may also overlap. Therefore, the detecting method in the existing protocols is not exact enough, which leads to that UE of the cell in the overlapping area in RNC receives plural sets of service content of the same MBMS service.

Additionally, for the parallel MBMS session start process of the same MBMS service, in the existing protocols, only MBMS service area of parallel MBMS session established between RNC and the same SGSN is detected, however, MBMS service area of parallel MBMS session established between RNC and a different SGSN is not detected. Thereby MBMS service areas of parallel session of the same MBMS service from different SGSNs may overlap, which leads to that UE of the cell in the overlapping area in RNC receives plural sets of service content of an identical MBMS service.

Therefore, a technical solution to settle the problems in the prior arts is in urgent need.

SUMMARY OF THE INVENTION

The present invention aims to provide a processing method and an apparatus for Iu interface parallel multimedia broadcast multicast service session start-up to settle the problem in the prior arts that UE of the cell in intersecting or overlapping area in RNC receives plural sets of service content of an identical MBMS service.

According to one respect, the present invention provides a processing method for Iu interface parallel multimedia broadcast multicast service session start-up, comprising: after a MBMS session start message sent by SGSN is received by RNC, whether other sessions of a same MBMS service have been established on the RNC is detected; when the other sessions of the same MBMS service are determined to have been established on the RNC, the RNC detects whether the MBMS service area carried in the MBMS session start message and that of the other MBMS sessions established between the RNC and the SGSN intersect or overlap, or whether the MBMS service area carried in the MBMS session start message and that of the MBMS session established between the RNC and other SGSNs intersect; and processing on MBMS session start is performed according to the detecting result.

Wherein, when it is determined other sessions of the same MBMS service are established on the RNC and the other sessions are established between the RNC and the SGSN sending the MBMS session start message, the RNC detects whether the MBMS service area carried in the MBMS session start message and that of the other established sessions intersect or overlap; or when the RNC determines other sessions of the same MBMS service are established and the other sessions are established between the RNC and other SGSNs instead of the SGSN sending the MBMS session start message, the RNC detects whether the MBMS service area carried in the MBMS session start message and that of the other established sessions intersect, and processing on multimedia broadcast multicast service session start-up is performed according to the detecting result.

Wherein, the MBMS service area of the MBMS session to be established is carried in the MBMS session start message.

The following process is performed to detect whether the MBMS service area of the MBMS session to be established and that of the other established sessions of the same service intersect: it is determined whether the MBMS service area corresponding to the other established sessions and that of the session to be established are the same, i.e. the two MBMS service areas have at least a same cell and at least a different cell.

The following process is performed to detect whether the MBMS service area of the MBMS session to be established and that of the other established sessions of the same service overlap: it is determined whether the MBMS service area corresponding to the other established sessions and that of the session to be established have completely the same cells, i.e. the two MBMS service areas have no different cells.

When it is determined to intersect or overlap the MBMS service area of the other sessions established between the RNC and the same SGSN or to intersect that established between the RNC and other SGSNs, the RNC decides the MBMS service area in the MBMS session start message to be invalid and returns a MBMS session start failure message to the SGSN.

Additionally, when no other established sessions of the same MBMS service are determined to exist in the RNC or the MBMS service area of other sessions of the same SGSN is not intersected or overlapped and the MBMS service area of other sessions of other SGSNs is not intersected, the RNC decides the MBMS service area in the MBMS session start message to be valid and MBMS session start request is processed according to the existing protocols.

The present invention also provides an apparatus for processing Iu interface parallel multimedia broadcast multicast service session, comprising: a first detecting unit for detecting whether other sessions of the same MBMS service are established after RNC receives a MBMS session start message initiated by SGSN; and a second detecting unit for detecting whether the MBMS service area carried in the MBMS session start message and that of other MBMS sessions established between the RNC and the same SGSN intersect or overlap or whether the MBMS service area carried in the MBMS session start message and that of other MBMS sessions established between the RNC and other SGSNs overlap, when the first detecting unit detects other sessions of the same MBMS service are established, and performing corresponding operations according to the detecting result.

The processing apparatus also comprises: a processing response unit for processing MBMS session start flow according to the existing protocols and returning MBMS session start response message or MBMS session start failure message to the SGSN according to the processing result, when the first detecting unit detects no other sessions of the same MBMS service are established.

Additionally, the processing apparatus also comprises: a judging response unit for judging the MBMS service area in the MBMS session start message to be invalid and returning MBMS session start failure message to the SGSN, when the second detecting unit detects that the MBMS service area carried in the MBMS session start message and that of other MBMS sessions established between the RNC and the same SGSN intersect or overlap or that the MBMS service area carried in the MBMS session start message and that of the MBMS session established between the RNC and other SGSNs intersect.

Additionally, the processing apparatus also comprises: a judging response unit for judging the MBMS service area in the MBMS session start message to be valid, processing MBMS session start flow according to the existing protocols and returning MBMS session start response message or MBMS session start failure message to the SGSN according to the processing result, when the second detecting unit detects that the MBMS service area carried in the MBMS session start message and that of other MBMS sessions established between the RNC and the same SGSN neither intersect nor overlap and that the MBMS service area carried in the MBMS session start message and that of the MBMS session established between the RNC and other SGSNs do not intersect.

MBMS service areas intersecting means different MBMS service areas have at least a same cell and at least a different cell. MBMS service areas overlapping means different MBMS service areas have completely the same cells.

Other characteristics and advantages of the present invention will be described in the following specification, and will be apparent partly from the specification and embodiments of the present invention. The objects and other advantages can be realized and obtained through the structure of the specification, claims, and the drawings.

BRIEF DESCRIPTION OF THE DRAWINGS

The figures illustrated herein provide a further understanding to the present invention and constitute a part of the present application. The schematic embodiments and explanations thereof serve to explain the present invention and are not intended to restrict it. In the figures.

DETAILED DESCRIPTION

The embodiments of the present invention will be illustrated in combination with the accompanying drawings in details as follows, and it is understood the embodiments described herein only serve to explain and interpret the present invention and not to restrict it.

Figure 4:
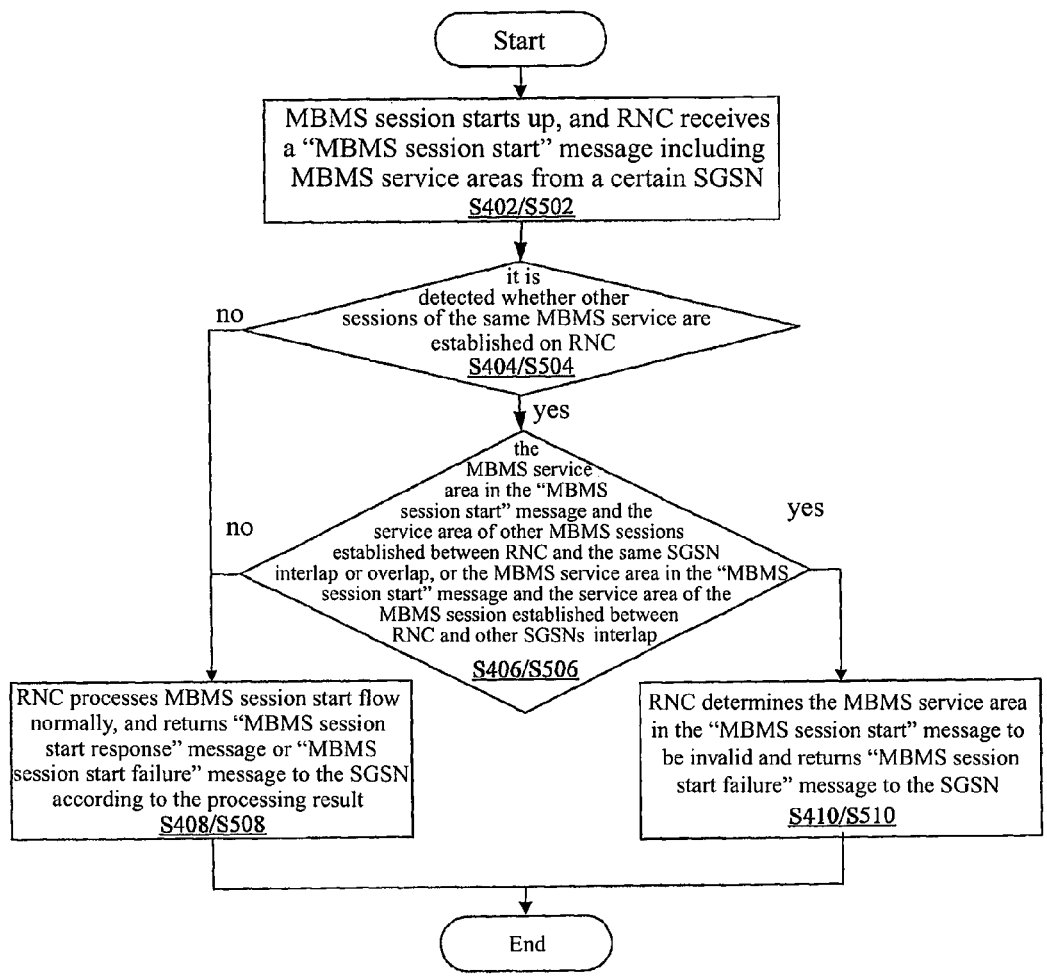
FIG. 4 is a work flowchart schematically showing the processing method of the Iu interface parallel multimedia broadcast multicast service session start-up according to the present invention.

FIG. 4 is a work flowchart schematically showing the processing method of the Iu interface parallel MBMS session start according to the present invention. As shown in FIG. 4, the method comprises the following steps:

Step 402, MBMS session starts up, and RNC receives a "MBMS session start" message of a certain SGSN, which includes MBMS services areas;

Step 404, it is detected whether other sessions of the same MBMS service are established in RNC. If yes, perform step 406, otherwise perform Step 408;

Step 406, when the other sessions are established between the RNC and the same SGSN, it is detected whether the MBMS service area of the other established sessions and that in the "MBMS session start" message intersect or overlap; when the other established sessions are established between the RNC and other SGSNs, it is detected whether the MBMS service area of the other established sessions and that in the "MBMS session start" message intersect. If yes, perform Step 410, otherwise, perform Step 408;

Step 408, the RNC determines the MBMS service area in the "MBMS session start" message to be valid, the MBMS session start flow is processed according to the existing protocols and "MBMS session start response" message or "MBMS session start failure" message is returned to the SGSN; and Step 410, the RNC determines the MBMS service area in the "MBMS session start" message to be invalid, the "MBMS session start failure" message is returned to the SGSN.

Wherein, MBMS service areas intersecting means different MBMS service areas have at least a same cell and at least a different cell. MBMS service areas overlapping means different MBMS service areas have completely the same cells.

Figure 1:
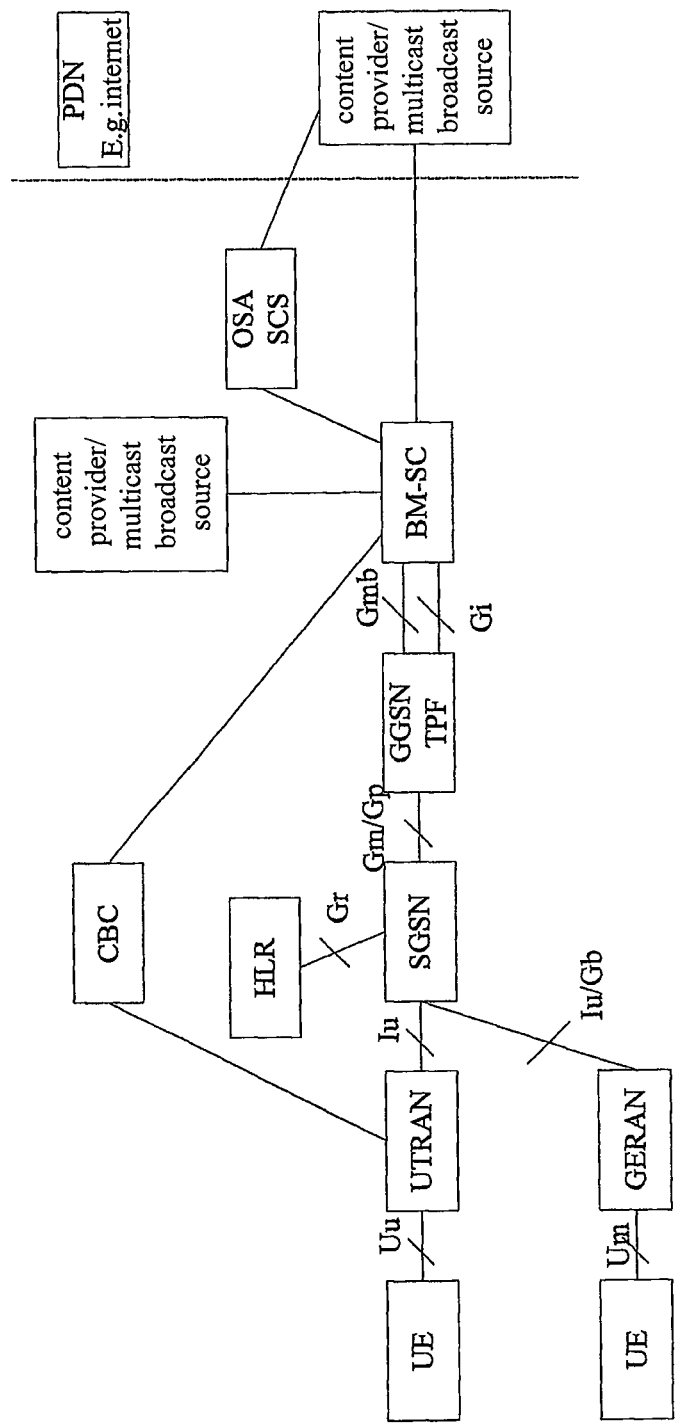
FIG. 1 is a structure model diagram showing MBMS service system in the prior arts.
Figure 2:
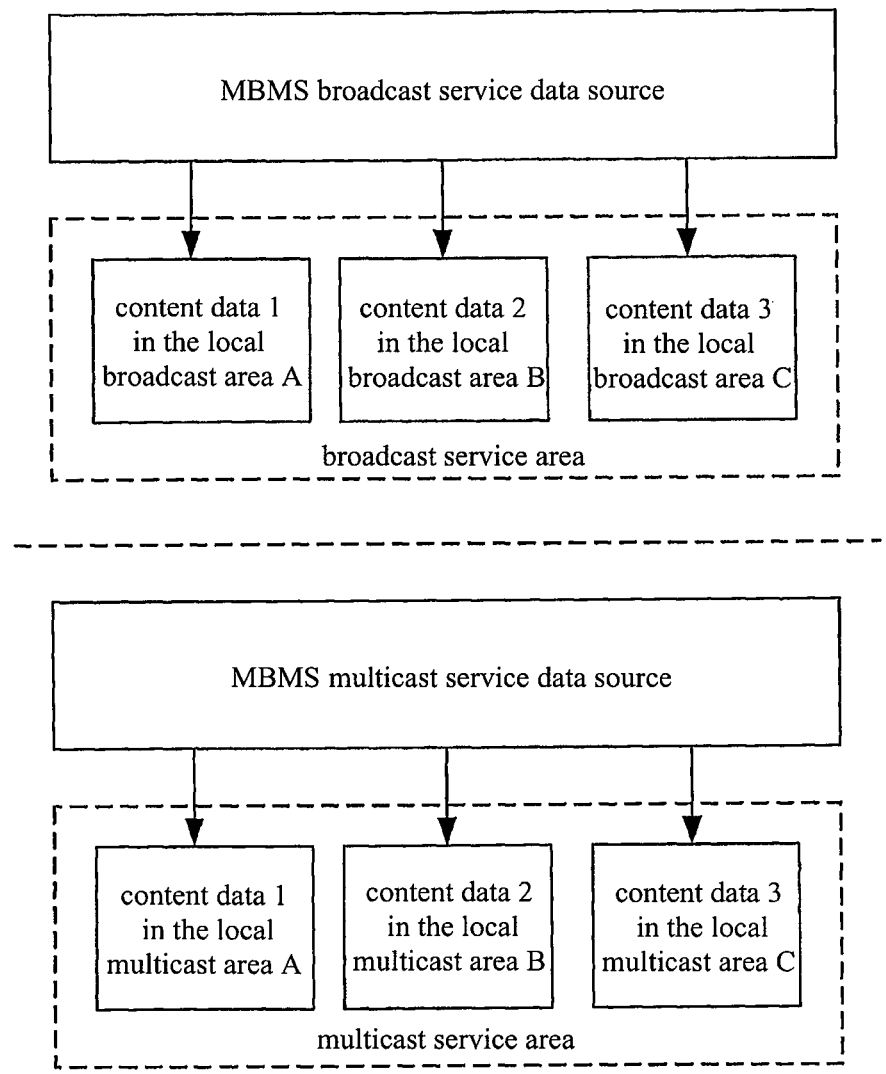
FIG. 2 is a diagram schematically showing the relations between MBMS service area and local service area.
Figure 3:
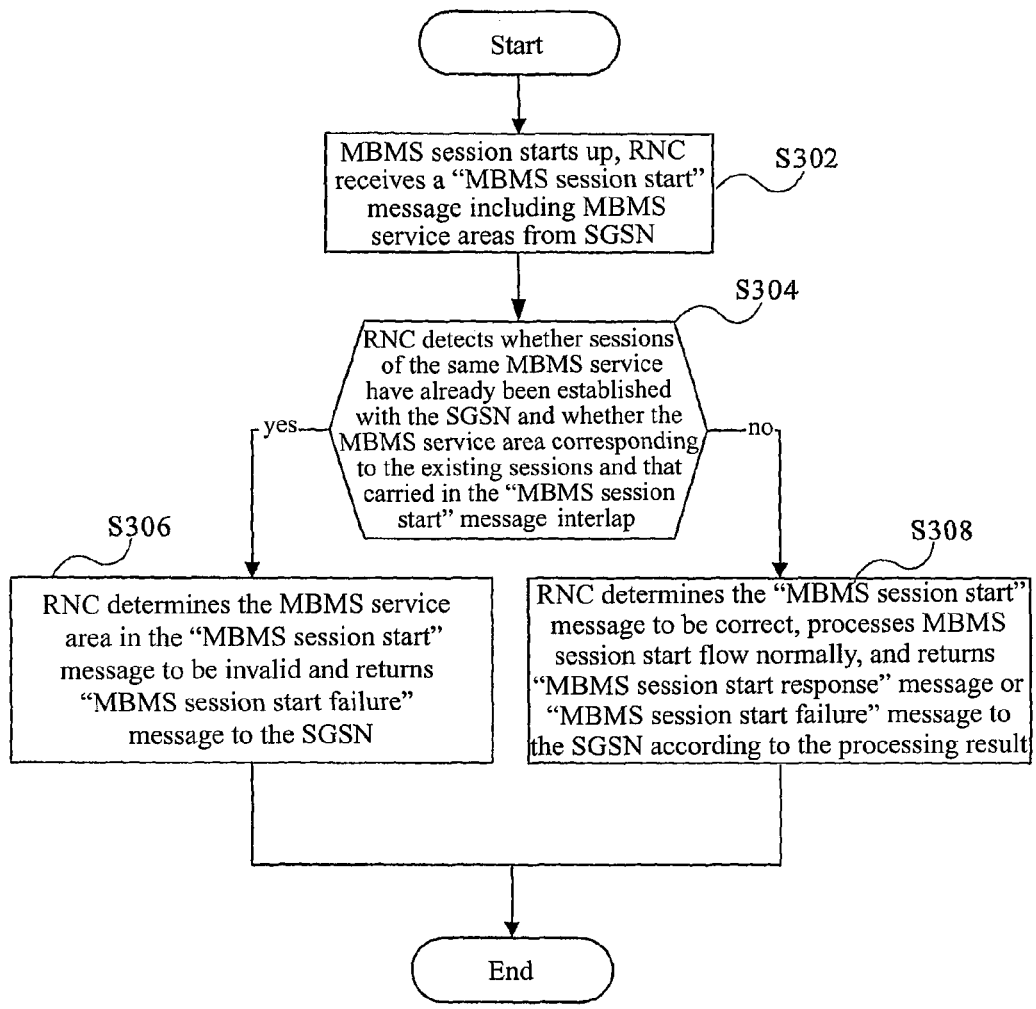
FIG. 3 is a work flowchart schematically showing Iu interface parallel MBMS session start in the prior arts.

The embodiment of the session start-up flow according to the present invention will be illustrated in details in combination with FIGS. 2 and 4.

In this embodiment, NNSF is activated, and RNC1 is connected with SGSN1 and SGSN2 at the same time. As shown in FIG. 2, a certain MBMS multicast service serves to send national traffic and road condition information and the multicast service area of the service is nation-wide. According to regional characteristics of service contents, the multicast service area of this service is divided into three local multicast areas A, B and C, the cells included in which do not intersect. Traffic and road condition information associated with the corresponding local multicast area is respectively sent in each local multicast area, i.e. UE may receive different traffic and road information in the local multicast areas A, B and C. When the MBMS multicast service session starts up, BM-SC respectively initiates MBMS session start of this service for the local multicast areas A, B and C, and the RNC1 at the edge of the local multicast areas A, B and C includes three cells corresponding to the local multicast areas at the same time.

In this embodiment, steps in FIG. 4 are illustrated as follows. It needs to be explained that steps 502 to 510 mentioned below are corresponding to steps 402 to 410, and the difference between them lies in combination with the concrete condition shown in FIG. 2. In order to distinguish the step numbers from those above, the step numbers in this embodiment are from Step 502 to Step 510 corresponding to Step 402 to Step 410 and correspondingly, each step number in FIG. 4 is illustrated in the form of S40x/S50x in the figure, where x=2, 4, 6, 8 and 10.

Step 502, SGSN1 and SGSN2 respectively initiates "MBMS session start" message to RNC1 for local multicast areas A, B and C to request the RNC1 to respectively establish sessions A1, B1 and C1, and sessions A2, B2 and C2. TMGIs carried in six "MBMS session start" messages are the same, i.e. they correspond to the same MBMS service;

Step 504, the RNC1 first receives the "MBMS session start" message of the MBMS session A1 initiated by the SGSN1, and performs step 508 to establish the MBMS session A1 with the SGSN1 if it is detected no other MBMS sessions of the same MBMS service are established in the RNC1;

Step 506, the RNC1 receives the "MBMS session start" message of the MBMS session B1 initiated by the SGSN1, and the MBMS session A1 of the same MBMS service is detected to be established between the RNC1 and the SGSN1. Moreover, the RNC1 also detects whether MBMS SA in the "MBMS session start" message and that of the MBMS session A1 intersect or overlap, if yes, perform step 510, otherwise perform step 508 to establish the MBMS session B1 with the SGSN1. Then the RNC1 receives the "MBMS session start" message initiated by the SGSN2, and the MBMS sessions A1 and B1 of the same MBMS service are detected to be established between the RNC1 and the SGSN1. Moreover, it is also detected whether MBMS SA in the "MBMS session start" message and that of the MBMS sessions A1 and B1 intersect or overlap, if yes, perform step 510, otherwise perform step 508 to establish the MBMS session A2 with the SGSN2 when it overlaps the MBMS SA of the MBMS session A1; or otherwise perform step 508 to establish the MBMS session C2 with the SGSN2 when it overlaps neither the MBMS SA of the MBMS session A1 nor that of the MBMS session B1. And then "MBMS session start" messages of other sessions received subsequently are processed in the same principle as steps 504 to 508.

Step 508, the RNC1 determines the MBMS service area in the "MBMS session start" message to be valid, the RNC 1 processes the MBMS session start request according to the existing protocols and returns "MBMS session start response" message or "MBMS session start failure" message to the SGSN according to the processing result; and Step 510, the RNC1 determines the MBMS service area in the "MBMS session start" message to be invalid, the "MBMS session start failure" message is returned to the SGSN that initiated the "MBMS session start" message.

Figure 5:
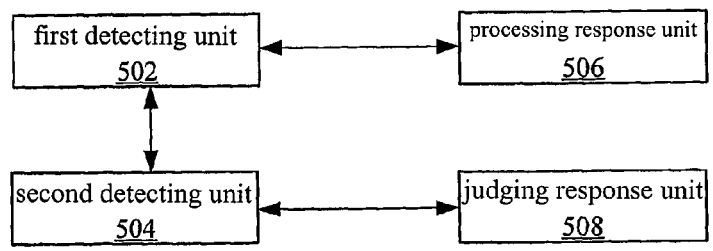
FIG. 5 is a block diagram showing the apparatus for processing the Iu interface parallel multimedia broadcast multimedia service session start-up according to the present invention.

FIG. 5 is a block diagram showing the apparatus for processing the Iu interface parallel multimedia broadcast multimedia service session start-up according to the present invention. As shown in FIG. 5, the processing apparatus comprises a first detecting unit 502 for detecting whether other sessions of the same MBMS service are established after RNC receives a MBMS session start message initiated by SGSN; and a second detecting unit 504 for detecting whether the MBMS service area carried in the MBMS session start message and that of other MBMS sessions established between the RNC and the same SGSN intersect or overlap or the MBMS service area carried in the MBMS session start message and that of other MBMS sessions established between the RNC and other SGSNs overlap, when the first detecting unit 502 detects other sessions of the same MBMS service are established, and performing corresponding operations according to the detecting result.

The processing apparatus also comprises: a processing response unit 506 for processing MBMS session start flow according to the existing protocols and returning MBMS session start response message or MBMS session start failure message to the SGSN according to the processing result, when the first detecting unit 502 detects no other sessions of the same MBMS service are established.

Additionally, the processing apparatus also comprises: a judging response unit 508 for judging the MBMS service area in the MBMS session start message to be invalid and returning MBMS session start failure message to the SGSN, when the second detecting unit 504 detects that the MBMS service area carried in the MBMS session start message and that of other MBMS sessions established between the RNC and the same SGSN intersect or overlap or that the MBMS service area carried in the MBMS session start message and that of the MBMS session established between the RNC and other SGSNs intersect; and for judging the MBMS service area in the MBMS session start message to be valid, processing MBMS session start flow according to the existing protocols and returning MBMS session start response message or MBMS session start failure message to the SGSN according to the processing result, when the second detecting unit 504 detects that the MBMS service area carried in the MBMS session start message and that of other MBMS sessions established between the RNC and the same SGSN neither intersect nor overlap and that the MBMS service area carried in the MBMS session start message and that of the MBMS session established between the RNC and other SGSNs do not intersect.

MBMS service areas intersecting means different MBMS service areas have at least a same cell and at least a different cell. MBMS service areas overlapping means different MBMS service areas have completely the same cells.

It can be seen from the above descriptions that the problems in the prior arts can be solved by the present invention so that Iu interface parallel MBMS session start can be processed in CDMA system.

The present invention has been shown with reference to the above-described embodiments, and it is not to be limited by the above embodiments. It is understood by those skilled in the art various alterations and changes may be made within the spirit and scope of the invention. All modifications, substitute equivalents or improvements made therein are intended to be embraced in the claims of this invention.

What is claimed is:

1. A method for processing Iu interface parallel multimedia broadcast multicast service session start-up, characterized in comprising the following steps:

detecting after a Multimedia Broadcast Multicast Service (MBMS) session start-up message initiated by a Serving General Packet Radio Service Support Node (SGSN) has been received by a Radio Network Controller (RNC), whether other sessions of the same MBMS service have been established on the RNC;

the RNC, when detecting that the other sessions of the same MBMS service have been established on the RNC, detecting whether the MBMS service area carried in the MBMS session start message interlaps or overlaps with that of the other MBMS sessions established between the RNC and the SGSN, or interlaps with that of the other MBMS session established between the RNC and other SGSNs, and performing the MBMS session start process according the the detecting result; and a determining response device of the RNC determining the MBMS service area in the MBMS session start message to be valid, processing MBMS session start flow, and returning MBMS session start response message or MBMS session start failure message to the SGSN according to the processing result when a detecting device of the RNC has detected that the MBMS service area carried in the MBMS session start message neither interlaps nor overlaps with that of other MBMS sessions established between the RNC and the SGSN, and do not interlap with that of the MBMS session established between the RNC and other SGSNs; and the determining response device of the RNC determining the MBMS service area in the MBMS session start message to be invalid and returning MBMS session start failure message to the SGSN when the detecting device of the RNC has detected that the MBMS service area carried in MBMS session start message interlaps or overlaps with that of other MBMS sessions established between the RNC and the SGSN, or interlaps with that of the MBMS session established between the RNC and other SGSNs.

2. The processing method according to claim 1, characterized in further comprising the following step: the RNC, when detecting that no other sessions of the same MBMS have been established, processing MBMS session start flow and returning MBMS session start response message or MBMS session start failure message to the SGSN according to the processing result.

3. The processing method to claim 1, characterized in the RNC, when detecting that other sessions of the same MBMS have been established and the MBMS service area carried in the MBMS start-up message do not interlap or overlap with that of other MBMS sessions established between the RNC and SGSN, do not interlap with that of the MBMS session established between the RNC an other SGSNs, determining the MBMS service area in the MBMS session start message to be valid, and then processing MBMS session start flow and returning MBMS session start response message or MBMS session start failure message to the SGSN according to the processing result.

4. The processing method according to claim 3, characterized in that the itnerlap of the MBMS service areas means that the different MBMS service areas have at least one same cell and at least one different cell.

5. The processing method according to claim 3, characterized in that the overlap of the MBMS service areas means that the different MBMS service areas have completely the same cells.

6. The processing method according to claim 1, characterized in the RNC, when detecting that the other sessions of the same MBMS have been established and the MBMS service area carried in the MBMS start-up message interlaps or overlaps with that of other MBMS sessions established between the RNC and SGSN, or interlaps with that of the MBMS session established between RNC and other SGSNs, determining the MBMS service area in the MBMS session start message to be invalid, and returning MBMS session start failure message to the SGSN.

7. The processing method according to claim 6, characterized in that the interlap of the MBMS service areas means that the different MBMS service areas have at least one same cell and at least one different cell.

8. The processing method according to claim 6, characterized in that the overlap of the MBMS service areas means that the different MBMS service areas have completely the same cells.

9. A Radio Network Controller (RNC) for processing Iu interface parallel multimedia broadcast multicast service session start-up, characterized in comprising:
 a first detecting device for detecting, after a Multimedia Broadcast Multicast Service (MBMS) session start-up message initiated by a Serving General Packet Radio Service Support Node (SGSN) has been received by a Radio Network Controller (RNC), whether other sessions of the same MBMS service have been established on the RNC;
 a second detecting device connected to the first detecting device, said second detecting device configured for detecting, when the first detecting device has detected that other sessions of the same MBMS service have been established, whether the MBMS service area carried in the MBMS session start message interlaps or overlaps with that of other MBMS sessions established between the RNC and the same SGSN, or overlaps with that of other MBMS sessions established between the RNC and other SGSNs overlap, and performing the MBMS session start process according to the detecting result, and a determining response device connected to the second detecting device, said determining response device configured for determining the MBMS service area in the MBMS session start message to be valid, processing MBMS session start flow, and returning MBMS session start response message or MBMS session start failure message to the SGSN according to the processing result when the second detecting device has detected that the MBMS service area carried in the MBMS session start message neither interlaps nor overlaps with that of other MBMS sessions established between the RNC and the SGSN, and do not interlap with that of the MBMS session established between the RNC and other SGSNs; and for determining the MBMS service area in the MBMS session start message to be invalid and returning MBMS session start failure message to the SGSN when the second detecting device has detected that the MBMS service area carried in MBMS session start message interlaps or overlaps with that of other MBMS sessions established between the RNC and the SGSN, or interlaps with that of the MBMS session established between the RNC and other SGSNs.

10. The Radio Network Controller (RNC) according to claim 9, characterized in further comprising:
 a processing response device connected to the first detecting device, said processing device configured for making the RNC, when the first detecting device has detected that no other sessions of the same MBMS service are established, process MBMS session start flow according to the existing protocols and return MBMS session start response message or MBMS session start failure message to the SGSN according to the processing result.

11. The Radio Network Controller (RNC) according to claim 9, characterized in that the interlap of the MBMS service areas means that the different MBMS service areas have at least one same cell and at least one different cell.

12. The Radio Network Controller (RNC) according to claim 9, characterized in that the different MBMS service areas have completely the same cells.

\* \* \* \* \*